COMMUNICATION SYSTEM WITH AUTOMATIC CHANNEL SELECTION

Filed Sept. 13, 1965

3 Sheets-Sheet 1

INVENTOR.
EDVARD MUNCH
BY Harvey S. Lowhurst
ATTORNEY

COMMUNICATION SYSTEM WITH AUTOMATIC CHANNEL SELECTION

Filed Sept. 13, 1965 3 Sheets-Sheet 2

INVENTOR.
EDVARD MUNCH
BY Harvey G. Lanshurst
ATTORNEY

COMMUNICATION SYSTEM WITH AUTOMATIC CHANNEL SELECTION

Filed Sept. 13, 1965 3 Sheets-Sheet 3

INVENTOR.
EDVARD MUNCH
BY Harvey G. Lambert
ATTORNEY

United States Patent Office 3,403,341

Patented Sept. 24, 1968

3,403,341

COMMUNICATION SYSTEM WITH AUTOMATIC CHANNEL SELECTION

Edvard Munch, Fremont, Calif., assignor, by mesne assignments, to The Rucker Company, Oakland, Calif., a corporation of California Filed Sept. 13, 1965, Ser. No. 486,650

39 Claims. (Cl. 325—65)

ABSTRACT OF THE DISCLOSURE

A multiple channel communication system in which the channel providing the best intelligence signal above the noise is automatically selected. The transmitted communication includes, in addition to the intelligence to be transmitted, a periodically varying characteristic superimposed upon the intelligence signal which has a frequency which is at least an order of magnitude lower than the lowest frequency of the intelligence. The intelligence signal, after having stripped from it the carrier, if any, is applied to a demodulator which provides a demodulated signal commensurate with the superimposed periodically varying characteristic. The demodulated signal is applied to a slow leakage rate accumulator which stores the positive going pulses of the demodulated signal. The stored signal therefore provides an output quantity which is a measure of the immediate past history of the demodulated signal. The output quantities from the various integrators are compared, and the one having the highest amplitude, above a selected minimum amplitude, is selected as being derived from the channel of the communication system having the highest signal-to-noise ratio.

This invention relates to communication systems, and more particularly, to a means and a method for the automatic selection of the best transmission path of a communication system which utilizes a plurality of transmission paths for transmitting intelligence from a transmitter station to a receiver station. In other words, the invention addresses itself to a communication system in which intelligence, generated by one station, is transmitted simultaneously along a number of transmission paths to a receiving station and in which the receiving station automatically selects and thereafter continually reselects one of the transmission paths on the basis of the best reception of the transmitted signal. The term "best reception" is used herein to designate the channel providing a maximum transfer of intelligence which is, generally speaking, the channel whose audio output signal has the greatest signal-to-noise ratio. An example of a communication system in which the transmission path selection system of this invention finds application is a system in which a stationary dispatcher is in constant communication with the drivers of a plurality of vehicles.

The complexity of vehicular communication systems has much increased in the past years, causing many problems for the dispatchers. Some of the more serious problems affecting the efficiency, reliability and speed of communications are: the proper selection of transmitter, receiver and frequency at remote relay stations; the selection of the best incoming audio signal when multiple relay transmitters are signalling due to overlap or geography; and the difficulties encountered by the dispatcher at the receiving station when receiving overlapping or fading audio signals which cause dispatcher fatigue and which, often times, result in misunderstandings between the dispatcher and the drivers.

The same difficulties are also encountered in air-to-ground, air-to-air, outer space-to-ground (or air) communication systems, whether transmitter and/or receiver are fixed or mobile. As long as multiple transmission paths are provided between a transmitting station and a receiving station, one transmission path (including its receiver channel) usually provides better reception than another transmission path (including its receiver channel). The same problems are also encountered with data transmission systems which transmit intelligence other than speech communication and which utilize multiple transmission paths. For example, telemetering data from satellites requires the strategic positioning of many antennas along the intended path of satellite travel, giving rise to multiple path transmission. This is also true of the transmission of television programs and the like which utilize substations. In the field of data transmissions and supervisory systems, multiple transmission paths are frequently used to assure reliable reception under all conditions.

Heretofore, the selection of the best transmission path was usually left to the operator who would, by trial and error, switch from one to the other to determine which path provided the best reception. Of course, when the operator found a transmission path which provided a relatively clear transmission, he would discontinue the selection process even though a much better channel might have been found if the process of selection had continued. Also, the operator would stay with a selected channel, despite its deterioration, until reception became unintelligible even though a much better channel became available soon after his initial selection.

It is, therefore, a primary object of this invention to automatically and repetitiously select the best of a number of transmission paths or channels between a transmitter and a receiver.

It is a further object of this invention to improve communication systems utilizing multiple transmission paths.

It is a further object of this invention to automatically and continually search for and select the best transmission channel between a transmitter and receiver on the basis of maximum intelligence output and/or maximum signal-to-noise ratio.

It is a further object of this invention to improve the quality of intelligence reception between an intelligence transmitting and intelligence receiving station.

It is another object of this invention to provide a communication system which reduces operator fatigue and increases the reliability of the communication.

It is still another object of this invention to automatically select the relay transmitter which provides the most intelligible communication channel between a transmitter and a distant receiver when multiple relay transmitters are signalling simultaneously.

It is also an object of this invention to utilize a characteristic of the intelligence being transmtted between a transmitting and a receiving station, connected by a plurality of transmission paths, to continually select and reselect the best transmission and/or reception channel for maximum efficiency and minimum loss of intelligence.

It is a further object of this invention to transmit along the transmitting path of a multipath communication system which provided the best reception just prior to transmission. In other words, in practicing this invention, the last communication transmission path is selected on the basis of received intelligence, and the path so selected is utilized to transmit to the station which furnished the intelligence from which a transmission path selection was made.

It is still a further object of this invention to determine the signal-to-noise ratio of a received signal.

Briefly, the present invention accomplishes the stated objects by constantly monitoring a unique periodic characteristic of the received intelligence from each channel, developing an output signal commensurate with the immediate past history of the monitored characteristic, comparing the output signals so developed with one another and with a selected reference signal, selecting the channel having an output signal whose amplitude first reaches the amplitude of the selected reference signal, and making a reselection after the expiration of a selected time interval.

The unique periodic characteristic being monitored may be one inherent in the received intelligence or may be one which is added to the received intelligence at the point of transmission by modulation. In either case, the selection process is the same.

By way of example, this invention will be described with particular reference to the selection of a voice communication channel which has been found to have an inherent unique periodic characteristic from which selection, in accordance with this invention, may be made. In the transmission of voice, a carrier is intentionally modulated with audio frequency signals (voice or speech) at the transmitter and is unintentionally modulated with speech envelop signals also at the transmitter. The speech envelop comprises speech impulses and speech pause intervals, and one speech impulse and one speech pause interval together constitute one speech envelop period. It has been found that there exists a characteristic speech envelop frequency of approximately two cycles per second and that the speed impulse and the speech pause are of approximately equal duration.

The audio frequency signal is therefore analogous to an interrupted continuous wave with a speech impulse and a speech pause interval, each interval being of an average duration of approximately one-quarter of a second. This signal, available at the output of the receiver channel, is applied to a speech envelop demodulator which provides a signal commensurate with the speech envelop amplitude. The demodulator has a rise and decay time constant which is typically one-third of the speech pause interval so that the demodulator output voltage, after having risen to a maximum during the speech impusle period, may decay to almost a zero level before the end of the speech pause interval.

The speech envelop demodulator is followed by an integrator which integrates the output voltage of the demodulator and which has a short rise time and a decay time which is very long compared with the speech envelop period so that its output signal increases in amplitude when the input is due to successive speech impulses. The decay time of the second integrator is selected so that a given number of consecutively received speech impulses and speech pause intervals will raise the output voltage of the integrator to a level which exceeds a reference level. The channel whose integrator first provides a signal whose amplitude is equal to or greater than the reference level is selected as the best channel. It is therefore seen that the amplitude of the integrator output voltage is commensurate with the immediate past history of the audio frequency signal and particularly with the immediate past history of the speech envelop.

Reselection is accomplished by a variable timing device which cancels a previously made selection so that reselection can take place. Manual means are provided to override the variable timing device after the ending of a transmission and provide immediate reselection.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

Figure 1:
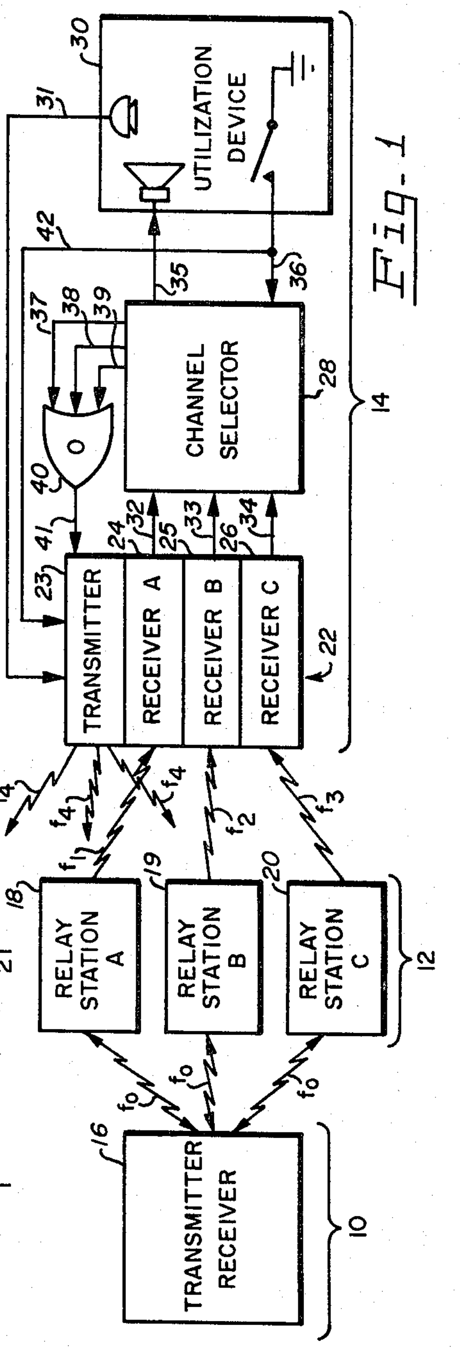
FIGURE 1 is a schematic block diagram of a communication system incorporating a channel selector in accordance with this invention.

Referring now to the drawings and more particularly to FIGURE 1 thereof, there is shown a multiple transmission path communication system incorporating the present invention. The system there shown comprises radio transmitter-receiver means 10, a multiple transmission path communication link 12 and a multiple channel transmitter-receiver means 14. The illustrated communication system, even though being a two-way system to afford transmission of intelligence in either direction, will be explained with primary reference to the transmission of intelligence from transmitter means 10 to receiver means 14, since channel selection is made during this mode of operation on the basis of the signals received by means 14.

Transmitter-receiver means 10 generally comprises a plurality of transceivers, one of which is shown at 16. Transceiver 16 may be fixed or mobile, either on the ground or in the air and transmits and receives intelligence modulated on a carrier of frequency $f_0$. By way of example, means 10 may comprise the transceivers located throughout a fleet of taxi cabs, transceiver 16 being the transceiver in a particular cab.

Multiple path communication link 12 comprises a plurality of relay stations, such as stations 18, 19 and 20, which are strategically placed throughout the geographical area of interest to receive the intelligence from the various transceivers, such as 16, and to relay this intelligence to receiver means 14. In other words, the relay stations are placed along the intended routes of the transceivers. Each relay station receives the intelligence at the carrier frequency $f_0$ from transmitter 16 and retransmits the intelligence on its own particular carrier frequency. For example, relay station 18, also identified as channel A, retransmits on a carrier frequency $f_1$, relay station 19, also identified as channel B, retransmits on a carrier frequency $f_2$, and relay station 20, also identified as channel C, retransmits on a carrier frequency $f_3$.

Means 14 comprises a transmitter and receiver portion 22 which includes a transmitter 23 which transmits intelligence on a carrier frequency $f_4$, a receiver 24 which is responsive to carrier frequency $f_1$, a receiver 25 which is responsive to carrier frequency $f_2$ and a receiver 26 which is responsive to carrier frequency $f_3$. It is to be understood that transmission link 12 may comprise a plurality of transmission wire lines in case the transceivers are stationary. In such a case, each receiver channel is directly connected by a different transmission wire line to transceiver 16.

The output signals from receivers 24, 25 and 26 are in the form of audio frequency signals which are applied, via receiver output leads 32, 33 and 34 respectively, to a channel selector means 28. Channel selector means 28 selects one of the receiver output signals in a manner hereinafter explained and applies the selected signal, via channel selector output lead 35, to a utilization device 30.

Utilization device 30 may include an operational display, a speaker means for voice reproduction (as indicated), and recorders and the like, for utilizing the received intelligence in a desired manner. Utilization device 30 may also include a microphone for voice transmission (as indicated) which is connected to transmitter 23, via lead 31, and a transmit button (as indicated) which is connected to channel selector means 28 via a lead 36 and to transmitter 23 via a lead 42. Lead 31 carries the audio frequency signal and leads 36 and 42 carry the transmit command.

As will become better understood hereinafter, the present invention is useful not only in selecting the receiver which provides the most intelligible transmission path receiver channel, but also provides means for responding along the previously selected transmission path, i.e., the transmission path which provided the most intelligible signal immediately preceding transmission. In the particular case illustrated, this is equivalent to selecting the relay transmitter over which the immediately preceding originating intelligence was received.

This is accomplished by causing the output of a selected channel to generate a code which is particular to that channel and to which the corresponding relay station is responsive. This code, henceforth referred to as "transmitter select code," is applied by output leads 37, 38 and 39, each of which is associated with a different one of receivers 24, 25 and 26, via OR gate 40 and lead 41, to transmitter 23 where it is mixed with the audio frequency signal (lead 31) from utilization device 30.

For example, if receiver 24 was selected as the best channel, a transmitter select code is then applied to selector output lead 37 and passed by OR gate 40, via lead 41, to transmitter 23. The transmitter transmits the audio frequency intelligence together with the transmitter select code whenever a transmit command is present on utilization device output lead 36. This transmitter select code signal selects relay station 18 on a carrier frequency $f_4$ for retransmission to transceiver 16 on the carrier frequency $f_0$.

Figure 2:
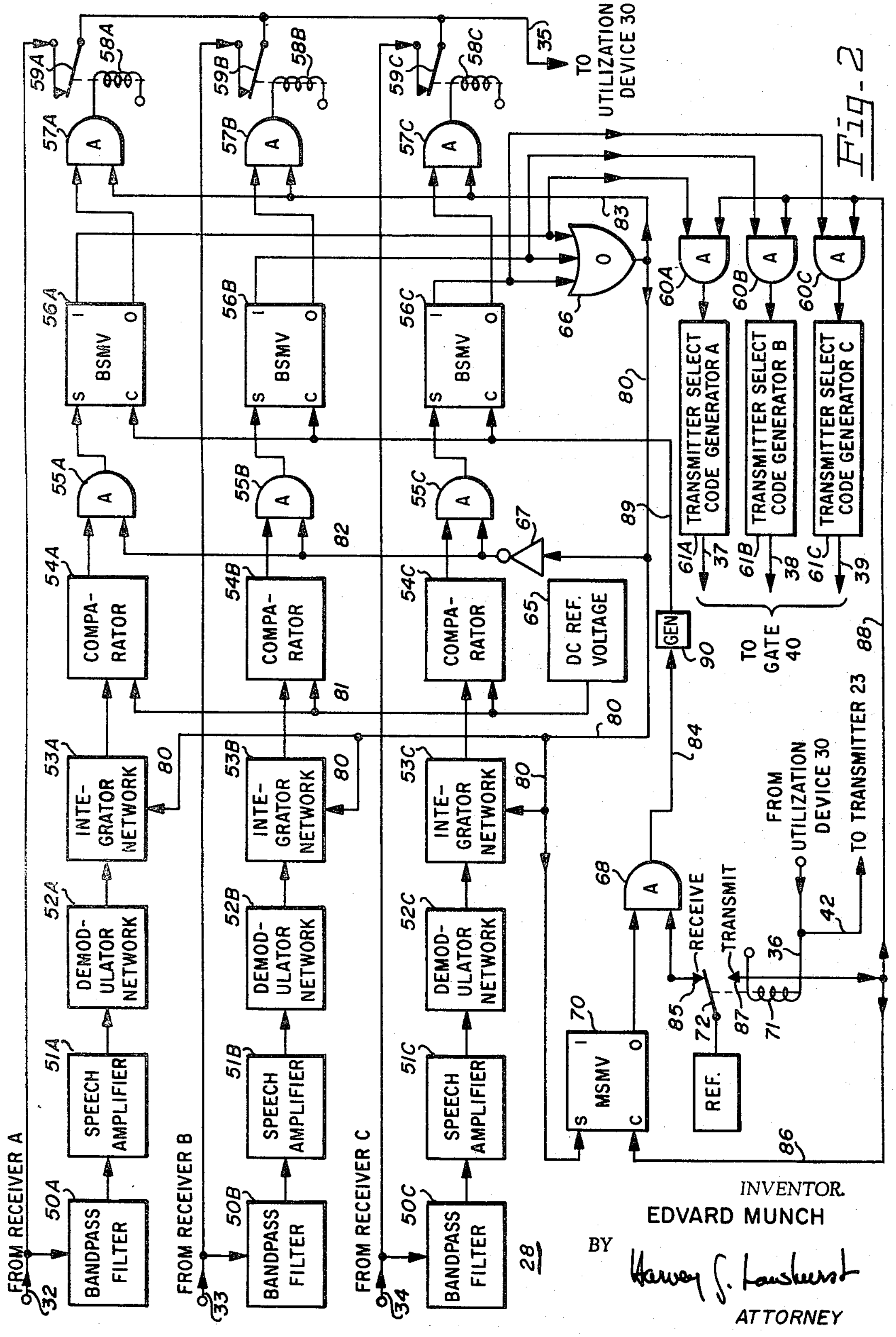
FIGURE 2 is a schematic block diagram of the channel selector shown in FIGURE 1.

Referring now to FIGURE 2, there is shown a schematic block diagram of channel selector 28 of FIGURE 1. Channel selector 28 comprises three substantially identical channels, each being associated with a different receiver. For simplicity, the blocks which are the same for each channel are identified by the same reference character followed by a reference character A, B or C which respectively designates selector channel A, B or C. It is, of course, to be understood that the three-channel system here illustrated is by way of example only, and that many more channels may be utilized.

Channel A receiver output lead 32 is connected to one contact of a normally closed switch 59A which is controlled by a relay 58A. Similarly, channel B receiver output lead 33 and channel C receiver output lead 34 are respectively connected to one contact of normally closed switches 59B and 59C, operated respectively by relays 58B and 58C. The other contacts of switches 58A, 58B and 58C are connected to common channel selector output lead 35. In this manner, all audio output signals, prior to the making of a selection, are applied to utilization network 30 and no information is lost. Instead of relay operated switches, solid state or active element type switches may be used.

Channel A receiver output lead 32 is also connected to a selector channel A comprising, in the order stated, a bandpass filter 50A, a speech amplifier 51A, a first speech envelop selection network 52A, a second speech envelop selection network 53A, and a comparator 54A. The output signal from comparator 54A is applied, through an AND gate 55A, to the set terminal of a bistable multivibrator 56A which, in turn, has its low output terminal connected, through an AND gate 57A, to relay 58A. Similarly, channel B and C receiver output leads 33 and 34 are respectively connected to bandpass filters 50B and 50C, speech amplifiers 51B and 51C, first speech envelop selection networks 52B and 52C, second speech envelop selection networks 53B and 53C and to comparators 54B and 54C. The output signals of comparators 54B and 54C are respectively applied, via AND gates 55B and 55C, to the set terminals of bistable multivibrators 56B and 56C which in turn have their low output terminal connected, through AND gates 57B and 57C, to relays 58B and 58C.

A source of reference voltage 65 has its output lead 81 connected, in parallel, to comparators 54A, 54B and 54C.

The high output terminals of bistable multivibrators 56A, 56B and 56C are connected, through an OR gate 66, to AND gates 57A, 57B and 57C via lead 83, and through lead 80 and inverter 67 to AND gates 55A, 55B and 55C via lead 82. Further, lead 80 is also connected to second selection networks 53A, 53B and 53C to provide a squelch signal, and to the set terminal of a monostable multivibrator 70. The low output terminal of multivibrator 70 is connected to an AND gate 68, which has an output lead 84 which is connected to a pulse generator 90. The output lead 89 of pulse generator 90 is connected to the clear terminals of multivibrators 56A, 56B and 56C.

There is also provided a single-pole double-throw switch 72, having a contact 85 for receive and a contact 87 for transmit, which is operated by a relay 71. Switch 72 is normally in the receive position and has its common contact connected to a reference voltage which is logic true. Receive contact 85 of switch 72 is also connected to AND gate 68 while transmit contact 87 is connected to the clear terminal of monostable multivibrator 70 and to AND gates 60A, 60B and 60C. The other inputs to AND gates 60A, 60B and 60C are connected to the high output terminals of bistable multivibrators 56A, 56B and 56C.

The output leads of AND gates 60A, 60B and 60C are respectively connected to transmitter code signal generators 61A, 61B and 61C which respectively provide the transmitter select code signals, on output leads 37, 38 and 39, for application to OR gate 40 of FIGURE 1.

Figure 3:
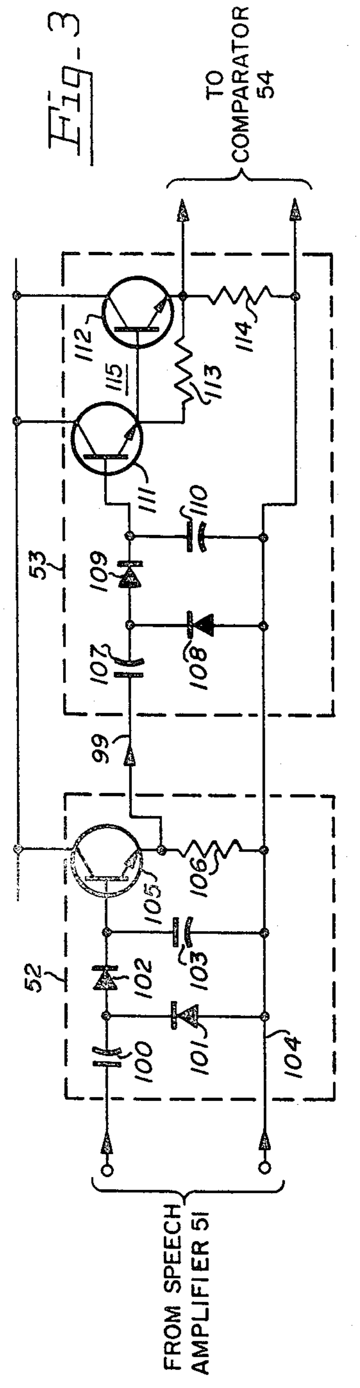
FIGURE 3 is a circuit diagram of the two serially connected speech selection networks shown diagrammatically in FIGURE 2.

Referring now to FIGURE 3, there is shown a schematic circuit diagram of speech envelop selective networks 52 and 53 to which the output signal of speech amplifier 51 is applied and which provide an output signal to comparator 54.

Network 52 comprises an input capacitor 100 which is connected in series with diode 102, to the input of an amplifier 105. Parallel paths are provided through a diode 101 and a capacitor 103, connected on either side of diode 102, to a return lead 104. Amplifier 105 is shown as a transistor and includes a loading resistor 106. Other amplifier configurations may be substituted for the one here illustrated.

The output signal from amplifier 105 is applied, via lead 99, to a capacitor 107 which is connected in series with a diode 109 to the input of an amplifier 115. Amplifier 115 is illustrated as having two stages, one stage including a transistor 111 and the other stage including a transistor 112. Parallel paths are provided through diode 108 and capacitor 110 connected on either side of diode 109 to return lead 104. Suitable loading of transistors 111 and 112 is provided by resistors 113 and 114.

Networks 52 and 53 each include an input and an output R-C time constant circuit which play important roles in practicing this invention. In fact, networks 52 and 53 may be considered, respectively, a speech envelop detector and an integrator as will now be explained with the aid of FIGURE 4.

Figure 4:
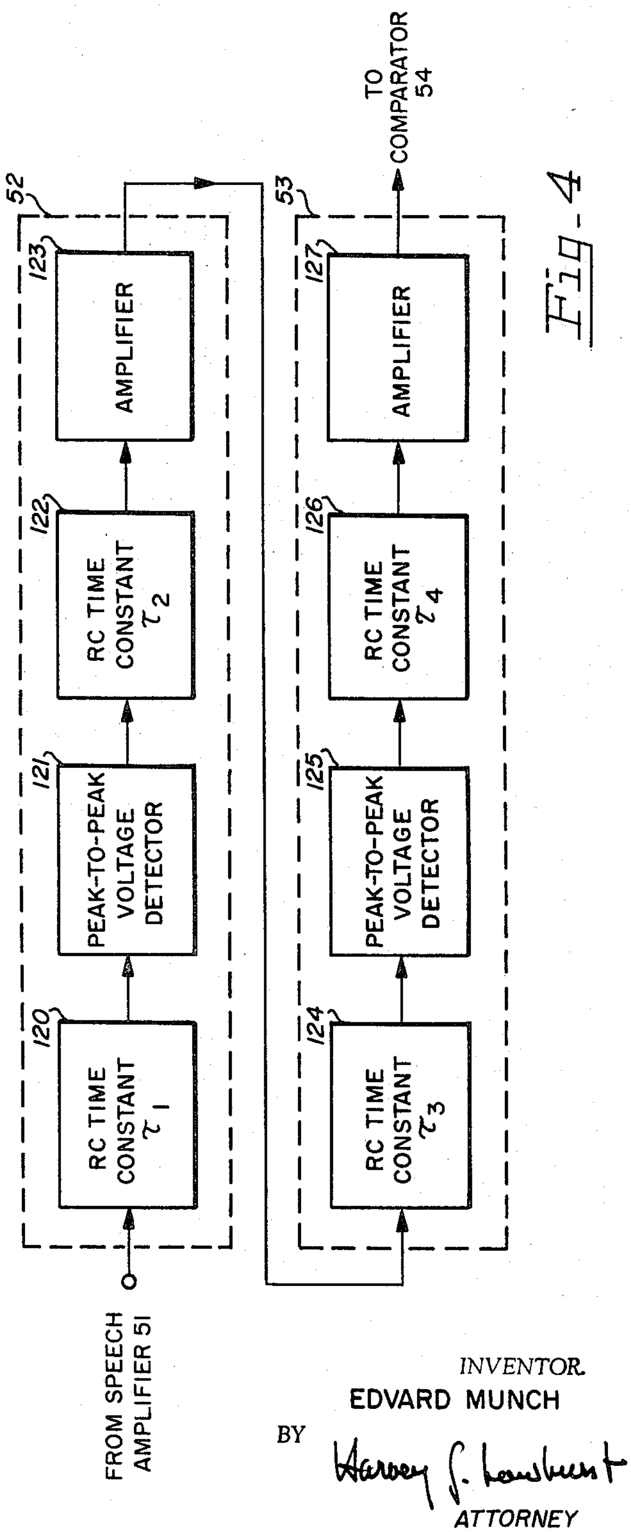
FIGURE 4 is an equivalent schematic block diagram of the speech selection networks shown in FIGURE 3.

As shown in FIGURE 4, network 52 is equivalent to the serial combination of an R-C time constant network 120, a peak-to-peak voltage detector 121, an R-C time constant network 122, and an isolation output amplifier 123. Similarly, network 53 is equivalent to the serial combination of an R-C time constant network 124, a peak-to-peak voltage detector 125, an R-C time constant network 126, and an isolation output amplifier 127.

Each block of network 52, as pictured in FIGURE 4, is derived as follows. The output resistance of speech amplifier 51 multiplied by the capacitance of capacitor 100 (FIGURE 3) equals a time constant $\tau_1$, and is represented by block 120. Capacitors 100 and 103 together with diodes 101 and 102 constitute a conventional peak-to-peak voltage detector which is represented by block 121. The input resistance to amplifier 105 multiplied by the capacitance of capacitor 103 equals a time constant $\tau_2$ and is represented by block 122, and amplifier 105 is represented by block 123.

The blocks of network 53 are derived in the same manner. The output resistance of amplifier 105 multiplied by the capacitance of capacitor 107 equals a time constant $\tau_3$ and is represented by block 124. Capacitors 107 and 110 together with diodes 108 and 109 constitute a conventional peak-to-peak voltage detector which is represented by block 125. The input resistance to amplifier 115 multiplied by the capacitance of capacitor 110 equals a time constant $\tau_4$ and is represented by block 126. Amplifier 115 is represented by block 127.

It will now be shown that network 52 acts as a speech envelop detector capable of recovering the speech characteristic for which $\tau_1$ and $\tau_2$ are optimized. If the output of network 52 is applied to the input of network 53, it will further be shown that this network will act as an integrator producing a voltage level which is a measure of the amplitude and frequency of the immediate past history of the speech envelop input. In fact, the integrator may be regarded as a memory device since, for normal continuous speech input, its output voltage will increase, the increase being greatest for a signal having the highest signal-to-noise ratio. Proper selection of time constants $\tau_3$ and $\tau_4$ are important factors contributing to achievement of this result.

Figure 5:
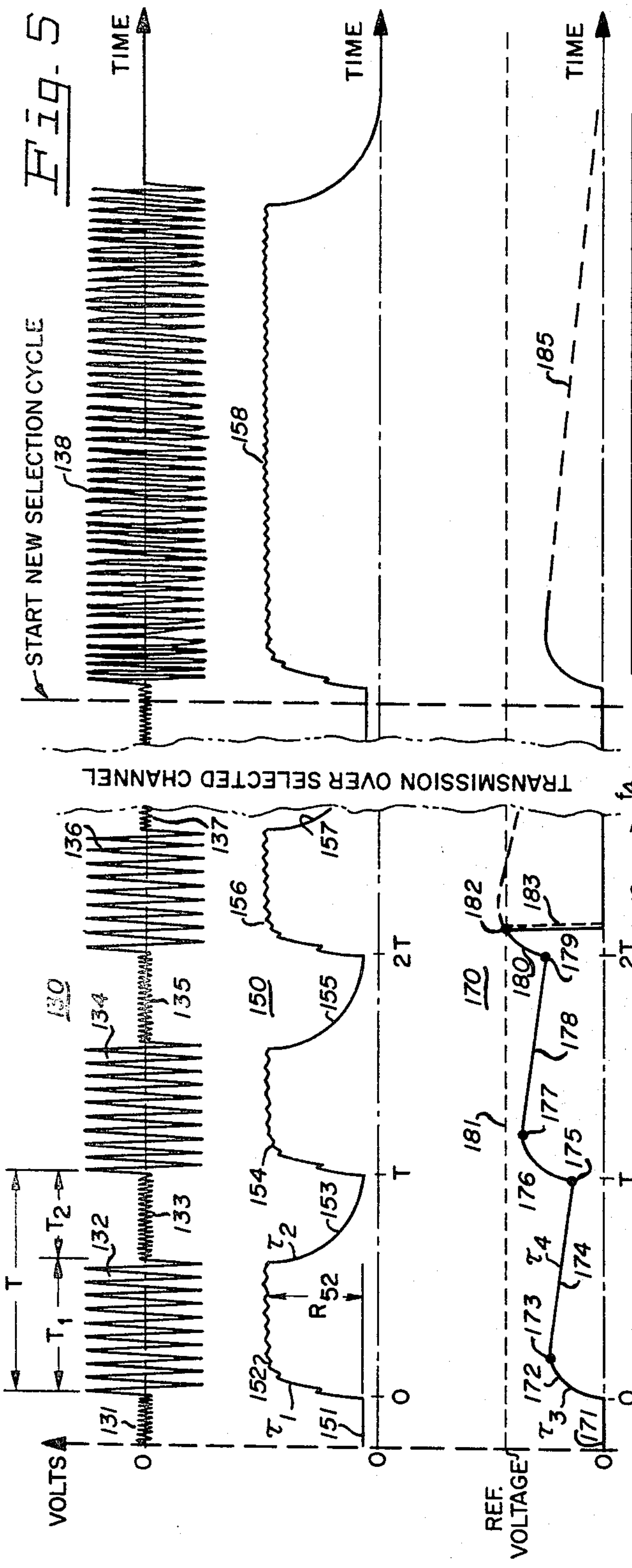
FIGURE 5 are a number of curves illustrating the output signals at various points of the circuit of FIGURE 3.

Referring now to the wave forms shown in FIGURE 5, which are typical of the electrical signals appearing at the input and output of networks 52 and 53, there are shown three voltage versus time curves, respectively identified by reference characters 130, 150 and 170. Curve 130 represents the output signal from speech amplifier 51 and shows, in the order stated, a portion 131 representing a noise signal 131 (absence of a speech impulse or a speech pause interval), a portion 132 representing an itnelligence signal 132 such as a speech impulse, a portion 133 representing a speech pause interval with background noise, a portion 134 representing a speech impulse, a portion 135 representing a speech pause interval, a portion 136 representing a speech impulse, a portion 137 depicting a speech pause interval and a portion 138 which may either represent noise or some signal other than speech. The reason that portion 138 does not represent speech, or at least is not representative of a usable speech signal, is the absence of speech pause intervals. This may be due to poor transmission of speech, or speech with a very large amount of background noise or other types of disturbances superimposed thereon. In any event, portion 138 signifies a poor or unusable signal, whatever its source.

The wave form shown generally by curve 130, and particularly by portions 132, 134 and 136, are understood to be representative of any combination of audio frequencies within a typical range, say 200 c.p.s. to 2000 c.p.s. The wave form, shown by portion 138, may represent any frequency or combination of frequencies within the passband of a channel selector.

As already stated, it has been found that voice communication involves alternating speech impulses and speech pause intervals as shown by portions 132 and 133, which recur with a period T. Within the period T, speech impulse portion 132 occupies a time interval $T_1$ and speech pause interval portion 133 occupies a time interval $T_2$. Even though the duration of $T_1$ and $T_2$ varies from speech envelop to speech envelop, the variations are sufficiently small so that they may be assumed as substantially constant.

Application of the audio frequency signal depicted by curve 130 to speech envelop detector 52 provides an output signal on lead 99 as represented by curve 150. As noise portion 131 is applied to network 52, it provides a low and nearly constant output voltage as indicated by portion 151. This is essentially the voltage to which capacitor 103 (FIGURE 3) has been charged.

It is assumed that the operation of a conventional peak-to-peak voltage detector (voltmeter) is well understood.

With the purpose in mind of determining time constant $\tau_1$, it may further be assumed that the following simplifications may be made. The time taken by the first cycle and a half of wave forms shown in portions 132, 134 or 136 may be ignored, and the rise and fall times of the wave forms shown in portions 132, 134 or 136 are so small that they may also be ignored.

Both of these assumptions are justified in view of the fact that time $T_1$ of one speech impulse is at least 200 times longer than that of one cycle of audio frequency. Now, returning to wave form 150, and particularly to portion 151, it is seen that the leading edge of speech impulse 132 causes output of network 52 to rise at a rate determined by time constant $\tau_1$. This is indicated by portion 152 of curve 150. It will be recalled that $\tau_1$ equals the speech amplifier 51 output resistance multiplied by the capacitance of capacitor 100. The consideration governing choice of $\tau_1$ is that output of network 52 should reach its maximum value within the time interval $T_1$. For all practical purposes this is achieved by choosing $\tau_1$ equal to or smaller than one-third of $T_1$. This indicates that the output resistance of speech amplifier 51 should be fairly low.

A second consideration is that the maximum value of the network 52 output voltage should be as high as possible, ideally equal to the peak-to-peak value of the speech impulse signal. This, again, is achieved by making the ratio of capacitance values of capacitors 100 and 103 equal to one.

Returning again to portion 152 of the output wave form, it will be understood that the curve 150 represents the average value of the output voltage. Superimposed on this average value is the familiar ripple of a peak-to-peak voltage detector. After elapse of a time interval equal to or longer than three times $\tau_1$, the maximum value is essentially reached as shown by portion 152. It can be shown that this maximum value is:

$$e_o = e_{in}\frac{R_o}{R_o + 2R_{in}}\ \text{Volts} \qquad (1)$$

Where:

$e_o$=average output voltage of network 52 after elapse of $3\tau_1$.
$e_{in}$=peak-to-peak value of speech impulse input signal.
$R_o$=output resistance of speech amplifier 51.
$R_{in}$=input resistance of amplifier 105.

This shows that the usefulness of network 52 output is measured by the difference between its high and low level and by the network's ability to repeat this difference in the presence of repeated speech implse-speech pause input signals. Examination of Equation 1 reveals that this difference would indeed be maximum and ideal if $R_{in}=0$. This provides an additional reason for keeping the output resistance of speech amplifier 51 low.

Aftef the the end of speech portion 132, the input signal takes the form shown by portion 133 of curve 130 causing a discharge of capacitor 103, the rate of which is determined by the time constant $\tau_2$ which is, as already indicated, equal to the capacitance of capacitor 103 multiplied by the input resistance of amplifier 105. The output signal from network 52, during the application of signal portion 133, is shown by portion 153 of curve 150. As the input signal changes, as indicated by portions 134, 135, 136 and 137 of curve 130, the corresponding output signal from network 52 changes as shown by the corresponding portions 154, 155, 156 and 157. For an input signal as shown by portion 138 of curve 130, the corresponding output signal is indicated by portion 158 of curve 150. Choice of time constant $\tau_2$ is governed by the consideration that it should be short compared to speech pause interval $T_2$ and long compared to the longest period of audio frequency signals contained in the speech impulse interval. These conditions are satisfied by choosing $$\tau_2 = \frac{T_2}{3}$$

seconds.

The output signal from selection network 52, represented by curve 150, is applied to selection network 53 which performs what has been termed an integrating function by providing an output signal which is essentially direct-current, the magnitude of which is proportional to the immediate past and the present amplitude and frequency of the output of network 52. More particularly, during the application of signal portion 151 of curve 150, network 53 provides no output signal as indicated by portion 171 of curve 170 because the output of network 52 remains constant. As the voltage amplitude of the applied signal rises, as indicated by portion 152, capacitor 110 is charged up to a voltage value commensurate with the maximum amplitude of portion 152. The rate of rise is determined by $\tau_1$ and $\tau_3$. Since both of these are very small compared to the speech envelop period T, $\tau_3$ may be selected equal to $\tau_1$. The output rise is represented by portion 172 and essentially follows $\tau_1$. As already stated, time constant $\tau_3$ is equal to the capacitance of capacitor 107 multiplied by the output resistance of amplifier 105.

After portion 172 reaches its maximum value, as indicated by point 173, marking the end of increasing portion 152, capacitor 110 commences to discharge at a rate determined by time constant $\tau_4$ which is equal to the capacitance of capacitor 110 multiplied by the input resistance of the output amplifier 115, as shown by portion 174.

As will presently be explained, time constant $\tau_4$ is selected in such a manner that capacitor 110 discharges only to a predetermined fraction of its maximum voltage within the time interval T, so that, at the commencement of the next cycle, capacitor 110 still retains a voltage as shown by point 175 of curve 170. It is this factor which makes network 53 a storage means which provides a measure of the immediate past history of the speech envelop signal.

During the second period, as signal portions 154 and 155 are applied to network 53, capacitor 110 is first charged, as shown by portion 176, to a new maximum value as shown by point 177, and thereafter commences its discharge as indicated by portion 178. Accordingly, at the end of the second period T, capacitor 110 retains a charge corresponding to the voltage level shown at point 179.

During the third period, as signal portion 156 is applied to network 53, capacitor 110 charges and the voltage across it increases, as shown by portion 180, until it reaches a selected reference voltage level, indicated by broken line 181. This is the level established by voltage source 65 of FIGURE 2, and point 182 represents the time at which the output signal from selection network 53 equals the reference voltage from source 65 and at which time comparator 54 provides an output signal. Portion 183 represents a decrease of the output signal from network 53 caused by a squelch action which in turn is triggered by the output signal from comparator 54.

It may be said that the usefulness of network 53 is measured by its ability to store the information contained in one speech envelop, delivered by network 52, in the form of a voltage level which increases in response to, and only in response to, a succession of speech envelop inputs.

Portion 185 of curve 170 illustrates the response of network 53 to any type of input other than a succession of speech envelops. Portion 158 pictures the output of network 52 and may represent either an abnormally long speech impulse or a prolonged burst of noise or a speech impulse without a speech pause. Whatever its nature or origin, the response of network 53 is, as shown by portion 185, an initial rise followed by an exponential decay. In other words, any input, which does not possess the characteristics assigned to a speech envelop, will not be able to produce a significant output from network 53.

The characteristic of gradual build-up in response to the proper input is achieved by controlling the maximum amplitude of each voltage rise 172, 176 and 180 shown in portion 170 and coordinating this amplitude with the rate of decay shown by portions 174 and 178. The maximum amplitude of each voltage rise is controlled by the capacitance ratio of capacitors 107 and 110 in network 53, $$\frac{C107}{C110} = \frac{1}{3}$$

being a typical ratio.

The amplitude of each voltage rise, 172, 176 and 180, is proportional to the product of the input signal amplitude and the capacitance ratio $C107/C110$ and a factor determined by the previous level of the output voltage of network 53.

The decay rate, in turn, of portions 174 and 178 is determined by $\tau_4$, a typical value of which would fall between two and five times the duration of speech envelop period T.

When the output signal from network 53 reaches the reference voltage level, as set by reference voltage source 65, a selection signal is originated by comparator 54. When the incoming audio signals from the various receivers are applied to associated speech selection networks, the channel providing a selection signal is the channel whose signal-to-noise ratio is the highest. This is immediately apparent from the fact that the speech selection network output signal is directly proportional to the difference between the amplitude of the audio signal, as shown by portion 132, and the noise signal, as shown by portion 131. Networks 52 and 53 therefore provide a means of determining, at least by way of comparison, the signal-to-noise ratio of the incoming signals.

The above criteria for selection of $\tau_1$, $\tau_2$, $\tau_3$ and $\tau_4$ are quite general and apply equally to data transmission other than speech. Generally speaking, as long as the transmitted data has some periodic characteristic, the characteristic allows demodulation and subsequent integration to provide a measure of the immediate past history to serve as a measure of intelligibility or signal-to-noise ratio.

The voltage level of reference voltage source 65, as indicated by broken line 181, is selected so that a selected number of consecutive speech impulses and speech pause intervals are necessary before the output of selection network 53 rises to the level of the reference voltage. As illustrated in FIGURE 5, voltage level 181 has been selected to require three successive periods of speech impulses to bring the selection network output voltage level to a point above the reference voltage level. Instead, the reference voltage level may be selected to require more or less successive periods for triggering.

Of course, if the signal-to-noise ratio of the audio signal decreases, the charge applied to capacitor 110 by each speech pulse decreases and, accordingly, more successive speech impulses may be necessary to raise the selector network output voltage to the reference voltage level. However, as long as the discharge during a period does not exceed the charge added by each cycle, the output voltage will eventually build up to provide a selection signal. It is to be noted that while the charge added by each period depends on the signal-to-noise ratio, the rate of discharge is only a function of the time constant $\tau_4$.

While the above explanation of FIGURE 5 has particular reference to selecting an audio signal channel, it is to be understood that this selection method may be utilized with any signal which has a periodic characteristic, either keyed or inherent in the signal. All that is necessary is the selection of time constants $\tau_1$ and $\tau_2$ in such a manner that the characteristic is demodulated and the selection of time constants $\tau_3$ and $\tau_4$ in a manner whereby successive envelop changes will increase the output voltage as long as the recovered or demodulated signal envelop indicates a usable received signal.

In operation, and assuming initiation of a transmission by a transceiver such as 16 of FIGURE 1, the intelligence signal is modulated on a carrier frequency $f_0$ and transmitted to relay stations 18, 19 and 20 for retransmission on carrier frequencies $f_1$, $f_2$ and $f_3$. Receivers 24, 25 and 26 are each responsive to a different one of these carrier frequencies and demodulate the same to recover the transmitted intelligence. If the intelligence signal is speech, the receiver output signals will be audio frequency signals. For simplicity, these audio frequency signals will be referred to as the channel A, B and C audio signals which are applied, respectively, via leads 32, 33 and 34 to the various channels of selector 28.

As best seen in FIGURE 2, leads 32, 33 and 34 are directly connected, via normally closed switches 59A, 59B and 59C, to channel selector output lead 35 so that, prior to the making of a selection, all receivers are connected to utilization device 30. As will become better understood hereinafter, selection of a particular channel is made by opening switches 59 of the non-selected channel, the switch of the selected channel remaining in the normally closed position. In this manner, there will be no loss of the received intelligence prior to the making of a selection.

Each of the receiver audio signals is also applied to one of the selector channels where the audio signals are respectively filtered by conventional bandpass filters 50A, 50B and 50C which typically have a bandpass frequency extending from 200 to 2000 cycles per second for speech. The filtered audio signals are then amplified respectively by conventional speech amplifiers 51A, 51B and 51C, and applied to speech envelop demodulator networks 52A, 52B, 52C and integrator networks 53A, 53B and 53C. Since, prior to making a selection, bistable multivibrators 56A, 56B and 56C are all assumed to be in the clear position, making the high output terminal false, there is no true signal being passed by OR gate 66 to inhibit networks 53A, 53B and 53C. Accordingly, networks 53A, 53B and 53C each provide an output signal as shown and explained in connection with the description of curve 170 of FIGURE 5.

Voltage source 65 applies a reference voltage, via lead 81, to comparators 54A, 54B and 54C. As soon as one of the integrator networks 53A, 53B or 53C provides an output voltage which equals or exceeds the reference voltage level 181, the associated comparator 54 will provide a channel selection signal on its output lead. As already indicated, prior to the setting of any multivibrators 56, the signal on lead 80 is false. Inverter 67, connected to lead 80, converts the false signal to a true signal on inverter output lead 82 which enables AND gates 55A, 55B and 55C.

Assume that comparator 54A provides a channel selection signal before any other comparator. This selection signal passes through AND gate 55A to set bistable multivibrator 56A which therefore reverses its true and false output signals making its high terminal true and its low terminal false. The true output of multivibrator 56A passes through OR gate 66 and is applied, via lead 83, to AND gates 57A, 57B and 57C. Since the signals applied to AND gates 57B and 57C by multivibrators 56B and 56C are also true, both these gates provide a true output signal which energizes relays 58B and 58C, thereby opening switches 59B and 59C to disconnect receiver B and receiver C from channel selector output lead 35 and a selection is made. The true signal applied to AND gate 57A, via OR gate 66, will not pass through this AND gate to actuate relay 58A since the signal supplied by multivibrator 56A is now false.

The true signal passed by OR gate 66 and applied to line 80 is changed to a false signal by inverter 67 and disables AND gates 55A, 55B and 55C, thereby preventing any subsequently developed channel selection signal from changing the channel selection. In other words, no further selections are possible until AND gates 55A, 55B and 55C are enabled once more. The true signal from OR gate 66 is also utilized, via lead 80, to squelch networks 53A, 53B and 53C so that the integrator output voltages remain zero until a new selection is desired.

The true signal from OR gate 66 is also utilized to set a monostable multivibrator 70 which provides a delay, henceforth called "selection delay," in accordance with the time interval desired between selection and reselection. The selection delay provided by multivibrator 70 may be anywhere from a few seconds to a few minutes, and depends entirely on the communication procedure and conditions.

For example, in an area which has a great number of physical obstructions and where communication is originated by fast moving objects, a shorter selection delay would be desired since a transmission path becomes blocked more quickly than in a flat and unobstructed area with slow moving objects.

The operation of monostable multivibrator 70 is correlated with the action of switch 72. Switch 72 may be slave-operated by the so-called "press to transmit" button on the operator's microphone located in utilization device 30, and is shown in its "receive" position which corresponds to receive condition of receiver means 14.

In the receive condition it is desired that monostable multivibrator 70 produce a predetermined delay after each selection and, after the predetermined delay, produce a signal to put channel selector 28 in a condition to make a new selection. It is further desired that an operator, when responding to an incoming communication by actuating the "press to transmit" switch while the selection delay is still active, transmits over the previously selected channel, this being the most favorable relay station for transmission. To accomplish this, the remaining part of the selection delay must be cancelled and the selection must be held for as long as the transmission lasts. The reason for holding the selection is obvious—the operator retains thereby his optimum communication path. Finaly, it is desired that at the end of the operator's transmission, when switch 72 returns to its "receive" position, the selection be immediately cancelled. The reason for cancelling the selection delay is based on the oprator's requirement of immediate reselection after the transmission.

These conditions are met by the means illustrated in FIGURE 2 which prevent resetting of multivibrators 56 when switch 72 is in the "transmit" position and which reset multivibrators 56 when switch 72 is returned to the "receive" position.

As has previously been explained, a true signal from OR gate 66 sets monostable multivibrator 70 and initiates a selection delay. The low terminal of multivibrator 70 is now false and closes AND gate 68. After elapse of the selection delay, the low terminal becomes true and provides a true input to AND gate 68. Since switch 72 is in its "receive" position, it also supplies a true input to AND gate 68 which is now open and which applies a reset pulse to all multivibrators 56 via pulse generator 90, thereby resetting multivibrator 56A. As a practical matter, pulse generator 90 may be constructed to provide a short reset pulse in response to the leading edge of the true signal.

Resetting multivibrator 56A causes OR gate 66 to provide a false signal which closes AND gates 57B and 57C resulting in the release of relays 58B and 58C, thereby closing switches 59B and 59C. The false signal from OR gate 66 removes the squelch signal from networks 53A, 53B and 53C and is also changed to a true signal by inverter 67 to open AND gates 55A, 55B and 55C. This, therefore, places the selector in the condition for making a new selection.

Depressing the operator's "press to transmit" switch causes a true signal to appear on lead 36 of relay 71 which, in turn, causes switch 72 to assume its "transmit" position. Assume now that channel A was selected and the selection delay was active immediately prior to change of switch 72 from "receive" to "transmit." A true signal now appears on lead 86 and resets monostable multivibrator 70. Its low terminal becomes true and wants to open AND gate 68, but cannot in the absence of the second true input required.

In the meantime, switch 72 delivers a true signal, via lead 88, to AND gates 60A, 60B and 60C. Since channel A is selected, there are now two true inputs to AND gate 60A which cause gate 60 to open and to activate transmitter select code generator 67A. Generator 67A provides the transmitter code select signal on output lead 37 which is applied, via OR gate 40, to transmitter 23. Transmitter 23 in turn passes the signal to all the relay stations and selects one, responsive to the code, for retransmission to the ultimate destination.

Upon the operator's releasing the "press to transmit" switch, a false signal appears on lead 36 of relay 71 which causes switch 72 to return to its "receive" position and to apply a true signal to AND gate 68. Since multivibrator 70 also supplies a true signal, the gate is open and a reset pulse is generated which cancels the previous selection and conditions channel selector 28 for making a new selection.

There has been described a channel selection system which may be used for two-way communication between a master, multichannel receiver and transmitter system and a plurality of movable or widely dispersed transceivers, connected to the master system by a plurality of transmission paths. Even though the system has been explained in terms of selecting an audio signal by the criteria that the average voice communication includes speech impulses and speech pauses at a frequency of two cycles per second, the invention may be utilized in connection with the reception of any kind of data where the reception quality may be recognized and compared by some periodic criteria.

For example, in pulse transmissions or in amplitude modulated systems it is only necessary that the carrier frequency be keyed in accordance with some periodic scheme so that the amplitude or frequency or phase of the incoming signal may be converted to a direct-current which is indicative of the amplitude of the received intelligence and inversely proportional to the time commencing with the start of reception. Selection is again made on the basis of which channel provides an output voltage which is in excess of an arbitrarily selected reference level. While this is no assurance that the selected channel provides a good trasmission or reception of the intelligence, it is assurance that the selected channel is the best of all available chanels.

For example, in data transmission systems utilizing a pulse train in which the width of the pulse represents the intelligence, the space between successive information pulses may be utilized for channel selection. For such a data transmission system, the information pulse corresponds to the speech impulse and the pace between successive information pules corresponds to the speech pause interval. The fact that the information pulse is of variable width would not be important since all incoming pulse trains are identical except for intelligibility.

While the above detailed description has shown described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

I claim:

1. The method of selecting one of a plurality of audio signals, originated by a common source and representing speech communication, for further processing, said method comprising the steps of:

demodulating each of said audio signals for developing demodulated signals commensurate with the envelop of the audio signals;

integrating each of said demodulated signals for developing integrated signals which provide a measure of the immediate past history of the envelop of the audio signals;

comparing the amplitude of each of said integrated signals with a selected reference voltage;

determining the integrated signal whose amplitude first becomes equal to said reference voltage; and selecting the audio signal giving rise to the so determined integrated signal for further processing.

2. The method of selecting one of a plurality of audio signals, originated by a common source and representing speech communication, for further processing, said method comprising the steps of:

demodulating each of said audio signals and developing demodulated signals commensurate with the envelop of the audio signals;

integrating each of said demodulated signals and developing integrated signals whose amplitudes increase with each successive amplitude increase of the demodulated signals and whose amplitudes decrease with the time between successive amplitude increases of the demodulated signals;

comparing the amplitude of each of said integrated signals with one another and determining the one first passing a selected amplitude; and selecting for further processing the audio signal which gives rise to the integrated signal first passing the selected amplitude.

3. The method of selecting one of a plurality of received intelligence signals, originated by a common source and including a periodically recurring characteristic, for further processing, said method comprising the steps of:

demodulating each of said intelligence signals and developing demodulated signals commensurate with the periodically recurring characteristic of the intelligence signals;

applying each of said demodulated signals for storage to an electronic memory device having a decay rate which is less than the period of the recurring characteristic to develop output signals which are commensurate with the immediate past history of the detected signals;

comparing the output signals with one another and determining the output signal having the highest amplitude; and selecting for further processing the intelligence signal which gives rise to the highest amplitude output signal.

4. The method of selecting one of a plurality of audio signals, originated by a common source and representing a speech communication, for further processing, said method comprising the steps of:

demodulating each of said audio signals and developing demodulated signals commensurate with the envelop of the audio signals;

applying each of said demodulated signals for storage to an electronic memory device which has a decay rate time constant in excess of one second to develop an immediate past history of the amplitude excursions of the demodulated signals;

comparing the signals stored in each of said memory devices with one another and determining the memory device having the highest stored signal; and selecting the audio signal, which gives rise to the highest stored signal, for further processing.

5. The method of selecting one of a plurality of audio signals, originated by a common source and representing a speech communication, for further processing, said method comprising the steps of:

demodulating each of said audio signals to develop demodulated signals commensurate with the envelop of the audio signals;

applying each of said demodulated signals for storage to an electronic memory device which has a decay rate time constant in excess of one second to develop an immediate past history of the amplitude excursions of the demodulated signals;

comparing the signals stored in each of said memory devices with the level of a reference voltage which is greater in amplitude than the signal stored by two successive amplitude excursions of maximum charge and occurring approximately within one-half second of one another; and selecting the audio signal, which gives rise to the stored signal which first exceeds the level of the reference voltage, for further processing.

6. A method of selecting the most intelligible channel in an intelligence signal transmission system including at least one transmitter, a multiple channel receiver connectible to a utilization device, and a separate transmission path for coupling said transmitter to each channel of said receiver, said method comprising the steps of:

demodulating a preselected periodically recurring characteristic of the intelligence signal, other than the transmitted intelligence, from each receiver channel to develop pulsed signals whose amplitudes vary in accordance with said preselected characteristic;

integrating each of said pulsed signals to develop integrated signals whose amplitudes increase proportionally with the amplitude changes of said pulsed signals;

comparing the integrated signals with a preselected reference voltage level;

selecting the integrated signal which first reaches said reference voltage level; and connecting the receiver channel from which said selected integrated signal was developed to said utilization device.

7. A method of selecting the most intelligible channel in an intelligence signal transmission system including at least one transmitter, a multiple channel receiver having each of its receiver channels connected to a utilization device, and a separate transmission path for coupling said transmitter to each channel of said receiver, said method comprising the steps of:

demodulating a preselected periodically recurring characteristic of the intelligence signal, other than the transmitted intelligence, from each receiver channel to develop pulsed signals whose amplitudes vary in accordance with said preselected characteristic;

integrating each of said pulsed signals to develop integrated signals commensurate with the immediate past history of the pulsed signals;

selecting the integrated signal whose amplitude first exceeds a preselected voltage level; and disconnecting all receiver channels, except the receiver channel from which said selected integrated signal was developed, from said utilization device.

8. A method of selecting the most intelligible channel in a speech communication system which has at least one transmitter, a multiple channel receiver having each receiver channel connected to a utilization device, and a separate transmission path for coupling said transmitter to each receiver channel, said method comprising the steps of:

demodulating the audio frequency envelop of each receiver channel output signal for developing demodulated signals;

integrating the demodulated signals to derive integrated signals whose amplitudes increase with successive amplitude increases of the demodulated signals and whose amplitudes decay between successive amplitude increases of the demodulated signals at a time constant rate in excess of one second;

comparing the integrated signals with a preselected reference voltage level for selecting the integrated signal which first exceeds said reference voltage level; and disconnecting all receiver channels, except the receiver channel from which said selected integrated signal was developed, from said utilization device.

9. A method of selecting the most intelligible channel in an intelligence transmission system including at least one transmitting station, a multiple channel receiver station connectible to a utilization device, and a separate transmission path for coupling said transmission station to each channel of said receiver station, said method comprising the steps of:

demodulating a preselected periodically recurring characteristic of the signals developed by each channel of said receiver station to derive demodulated signals;

accumulating a charge corresponding to the amplitude increases of the demodulated signals in separate storage means;

allowing a predetermined percentage of the charge so accumulated in the storage means to leak off at a leakage rate selected such that the amount of charge leaking off during the time interval between successive normal occurrences of said recurring characteristic is less than the charge stored by a normal amplitude increase of the demodulated signals;

continuously comparing the charge accumulated on each storage means with a preselected reference charge and developing a selecting signal when a stored charge exceeds the reference charge; and selecting the receiver channel which developed said selection signal for connection to a utilization device.

10. A method in accordance with claim 9 in which the transmitted signal represents speech and in which the leakage rate corresponds to a time constant of between one to ten seconds.

11. An intelligence communication system with automatic channel selection comprising, in combination:

signal generation means for providing a transmittable signal which includes the intelligence to be transmitted and in which only the portions of the transmittable signal including such intelligence further include a periodically varying characteristic of a frequency at least an order of magnitude lower than the lowest frequency of the intelligence to be transmitted;

a plurality of receiver means;

a separate transmission path for conveying said transmittable signal from said signal generation means to each of said receiver means and defining a channel therewith, each receiver means providing a receiver output signal including said intelligence;

demodulation means responsive to each of said receiver output signals and operative to provide demodulated signals commensurate with said varying characteristic;

integrator means responsive to each of said demodulated signals and operative to develop integrated signals, said integrator means including a charge storage means having a decay time constant which is greater than one period of said periodic characteristic;

comparator means responsive to each of said integrated signals for selecting the channel providing the integrated signal which first rises in amplitude to a predetermined level and for providing a channel selector signal indicative of the selected channel;

common utilization means responsive to said receiver output signals; and switch means for connecting each of said receiver means to said utilization means, said switch means being responsive to said channel selector signal and operative to couple the receiver means of the selected channel to said utilization means.

12. An intelligence communication system with automatic channel selection comprising, in combination:

signal generation means for providing a transmittable signal which includes the intelligence to be transmitted and in which only the portions of the transmittable signal including such intelligence further include a periodically varying characteristic having a frequency which is at least an order of magnitude lower than the lowest frequency of the intelligence to be transmitted;

a plurality of receiver means;

a separate transmission path for conveying said transmittable signal from said signal generation means to each of said receiver means and defining a channel therewith, each receiver means providing a receiver output signal including said intelligence;

demodulation means responsive to each of said receiver output signals and operative to provide demodulated signals whose amplitudes vary in accordance with said periodically varying characteristic;

an accumulator means responsive to each of said demodulated signals to provide an output quantity which is a measure of the immediate past history of the demodulated signals, said accumulator means having a decay time constant which is greater than the period of said periodically varying characteristic;

comparator means responsive to said output quantities and operative to provide a channel selector signal indicative of the channel whose output signal caused the output quantity of an accumulator means to exceed a predetermined level;

receiver output signal utilization means; and switch means for connecting each of said receiver means to said utilization means, said switch means being responsive to said channel selector signal and operative to couple only the receiver means of the selected channel to said utilization means.

13. An intelligence communication system with automatic channel selection comprising, in combination:

signal generation means for providing a transmittable signal which includes the intelligence to be transmitted and in which only the portions of the transmittable signal including such intelligence further include a periodically varying characteristic having a first condition of duration $T_1$ and a second condition of duration $T_2$;

a plurality of receiver means;

a separate transmission path for coupling said transmittable signal from said signal generation means to each of said receiver means and defining a receiver channel therewith, each receiver means providing a receiver output signal;

demodulation means responsive to each of said receiver output signals and operative to provide demodulated signals whose amplitudes vary in accordance with said periodically varying characteristic;

integrator means responsive to each of said demodulated signals and operative to develop integrated signals whose amplitudes increase with each amplitude change of said demodulated signals and decreases with the time between successive amplitude changes of said demodulated signals at a preselected rate;

comparator means responsive to each of said integrated signals for selecting the channel which provides the integrated signal whose amplitude first exceeds a predetermined level and for providing a channel selector signal indicative of the selected channel;

common utilization means adapted to utilize said receiver output signals; and switch means connectible between each of said receiver means and said utilization means, said switch means being responsive to said channel selector signal and operative to connect only the receiver means of the selected channel to said utilization means.

14. An intelligence communication system in accordance with claim 13 in which said demodulation means includes an input time constant which is shorter than the duration $T_1$ and an output time constant which is shorter than the duration $T_2$.

15. An intelligence communication system in accordance with claim 13 in which said integrator means has an input time constant which is shorter than the duration $T_1$ and an output time constant which is longer than the duration of $T_1+T_2$.

16. An intelligence communication system in accordance with claim 13 in which each of said integrator means include squelch means which is responsive to said channel selector signal and operative to disable said integrator means upon the occurrence of said channel selector signal.

17. An intelligence communication system in accordance with claim 13 which further includes, a delay means responsive to said channel selector signal and operative to provide a channel reselection signal a selected time interval after the occurrence of said channel selector signal, and a squelch means associated with each integrator means responsive to said channel selector signal and said channel reselection signal and operative to respectively disable and enable said integrator means, and in which said switch means is also responsive to said channel reselection signal and operative to connect all receiver means to said utilization means upon the occurrence of said channel reselection signal.

18. An intelligence communication system in accordance with claim 13 which further includes a delay means responsive to said channel selector signal and operative to provide a squelch signal of a predetermined duration and a channel reselection signal at the end of said duration, said integrator means each including a squelch means responsive to said squelch signal to disable said integrator means for said predetermined duration, said switch means also being responsive to said channel reselection signal and operative to couple all receiver means to said utilization means.

19. A speech communication system with automatic receiver channel selection comprising, in combination:

at least one transmitter means for providing a transmitted signal which includes audio signals representing speech communication;

a plurality of receiver means at a receiving station;

a separate transmission path for coupling said transmitted signal to each of said receiver means and defining a receiver channel therewith, each receiver means providing a receiver output signal in the form of said audio signals;

demodulator means coupled to each receiver means and responsive to said receiver output signals, said demodulator means providing demodulated signals in accordance with the amplitude envelops of said audio signals;

integrator means including storage means coupled to each demodulator means for integrating said demodulated signals and for charging said storage means whenever the demodulated signal changes its amplitude in a predetermined direction, said storage means having a decay time constant which is greater than one second;

comparator means responsive to the charge on said storage means and operative to select the storage means which first charges to a predetermined level, said comparator means providing a channel selector signal indicative of the channel which includes said selected storage means and which defines a selected receiver channel;

utilization means responsive to said receiver output signals; and switch means between said receiver means and said utilization means, said switch means being responsive to said channel selector signal and operative to couple only the receiver means of the selected receiver channel to said utilization means.

20. A voice communication system with automatic receiver channel selection comprising:

transmitter means for providing a transmitted signal which includes audio signals representing speech communication;

a plurality of receiver means;

a separate transmission path for coupling said transmitted signal to each of said receiver means and defining a receiver channel therewith, each receiver means providing an output signal in the form of said audio signals;

a first channel selection network coupled to each receiver means to develop a first signal which is commensurate with the amplitude envelop of the output signal;

a second channel selection network coupled to each first selection network for integrating said first signal and for developing a second signal which represents the immediate past history of said first signal and which is directly proportional to the past amplitude changes of said first signal and inversely proportional to time between past amplitude changes of said first signal;

comparator means for selecting the receiver channel whose second signal first exceeds a predetermined level and for providing a channel selector signal indicative of the selected channel;

receiver output signal utilization means; and switch means for connecting said receiver means to said utilization means, said switch means being responsive to said channel selector signal and operative to couple only the receiver means of the selected channel to said utilization means.

21. A voice communication system in accordance with claim 20 in which said first channel selection network has a rise and a fall time constant which is less than one-eighth of a second, and in which said second channel selection network has a rise time which is less than an eighth of a second and a fall time which is greater than one second.

22. A voice communication system in accordance with claim 21 in which said switch means normally connects all of said receiver means to said utilization means and disconnects all receiver means except the receiver means of said selected channel upon the occurrence of said channel selector signal.

23. A voice communication system in accordance with claim 22 which further includes a control means responsive to said channel selector signal and operative to provide a squelch signal upon the occurrence of said channel selector signal and a reselector signal a predetermined time thereafter, each of said second channel selection networks including a squelch means responsive to said squelch signal and said reselector signal to respectively disable and thereafter enable said second channel selection networks from developing said second signals.

24. A voice communication system in accordance with claim 23 in which said switch means is also responsive to said reselector signal and operative to reconnect all receiver means to said utilization means.

25. A voice communication system in accordance with claim 23 in which a further transmitter means is associated with said receiver means, and a further receiver means is associated with said first named transmitter means, and in which said further transmitter means is connected to said further receiver means through each of said transmission paths, said further transmitter means providing a hold signal upon and during being enabled and a further reselector signal upon being disabled, means responsive to said hold signal for preventing the application of said squelch signal and said reselector signal to said squelch means and said switch means respectively during the occurrence of said hold signal, said further reselector signal being applied to said switch means to reconnect all receiver means to said utilization means.

26. An automatic channel selector for a multiple channel receiving system in which each of the channels are coupled to a common intelligence signal source through a different transmission path and in which each channel provides an output signal commensurate with the intelligence signal developed by said signal source for connection to an intelligence signal utilization means, said channel selector comprising:

detector means connected to each of said channels to receive the output signals, said detector means being responsive to the intelligence signal envelop of the output signal and operative to provide a detected signal commensurate with the envelop of the intelligence signal;

accumulator means connected to each of said detector means and responsive to said detected signals, each of said accumulator means being operative to provide an accumulated signal which is a measure of the immediate past history of the detected signal in that it increases in amplitude with each successive amplitude change of said detected signal and decreases in amplitude with the time interval between the successive amplitude changes of said detected signal;

comparator means connected to each of said accumulator means for continuously comparing the amplitudes of said accumulated signals with a reference voltage and for providing a channel selector signal when one of the accumulated signals exceeds said reference voltage; and means responsive to said channel selector signal to apply the output signal of the receiver channel so selected to said utilization means.

27. An automatic channel selector, connectible between a multiple channel receiver and a receiver output signal utilization device, and in which each channel is coupled to the same speech signal source through a different transmission path providing an audio frequency output signal, for selecting the receiver channel providing the output signal having the highest signal-to-noise ratio for utilization with said utilization device, said channel selector comprising:

audio frequency envelop detector means connected to each receiver channel to receive the output signal, said detector means being operative to provide detected signals commensurate with the audio frequency envelops of the output signals;

integrator means connected to said detector means and responsive to said detected signals, said integrator means being operative to provide integrated signals which measure the immediate past history of the detected signals in that each integrated signal increases in amplitude with each successive amplitude change of said detected signal and decreases in amplitude in accordance with the time elapsed between the immediately past successive amplitude changes of said detected signal;

a common source of reference voltage;

comparator means connected to each integrator means and to said common source of reference voltage, each said comparator means comparing the amplitude of said integrated signals and said reference voltage and developing a selector signal when said integrated signal exceeds said reference voltage, said comparator means including squelch means responsive to a squelch signal to disable said comparators;

switching means for connecting each of said receiver channels to said utilization means, each of said switching means being responsive to a switching signal and being normally closed to apply each of said output signals to said utilization means;

control means responsive to said selector signal and operative to develop said squelch signal to disable all comparator means upon the occurrence of said selector signal and switching signals for opening all switching means except the switching means of the receiver channel which provided said selector signal.

28. An automatic channel selector in accordance with claim 27 in which said integrator means has a decay time constant which is selected to be sufficiently high so that, during the reception of normal speech, the decrease in amplitude between two successive amplitude changes due to decay is less than the increase in amplitude due to the changing amplitude of the second of such two successive amplitude changes.

29. An automatic channel selector in accordance with claim 27 in which said integrator means has an output circuit time constant which is greater than one second.

30. An automatic channel selector in accordance with claim 27 in which the input and output time constants of said detector means and the input time constant of said integrator means are shorter than one-quarter second and longer than one-hundredth of a second and in which the output time constant of said integrator means is longer than one second and shorter than ten seconds.

31. In a multiple channel communication system for transmitting a signal having a periodic characteristic in addition to the intelligence, and in which a signal transmitting means is coupled to a signal utilization means through a plurality of channels each of which comprises the combination of a transmission link and a signal receiver each of which provides a channel output signal for application to the signal utilization means, the improvement for automatically selecting the best available channel output signal for application to the signal utilization means, said improvement comprising:

detector means connected to each receiver to receive its channel output signal and to provide a detected signal whose wave form is commensurate with the periodic characteristic of the channel output signal;

memory means connected to each detector means to receive its detected signal and to provide a memory signal which is a measure of the immediate past history of said detected signal in that it rises in amplitude with each amplitude change of said detected signal and decays in amplitude during the elapsed time between amplitude changes of said detected signal, said memory means having a decay time constant greater than twice the period of the recurring characteristic;

comparator means connected to each memory means to receive its memory signal and to provide a selector signal when a memory signal reaches a preselected voltage level; and a switching means responsive to said selector signal and operative to disconnect each channel, except the one which caused the generation of said selector signal, from the utilization device.

32. In a multiple channel communication system in accordance with claim 31 in which the improvement further includes a control means responsive to said selector signal and operative to provide a squelch signal of predetermined duration upon the occurrence of said selector signal and a reselector signal at the end of said predetermined duration, said memory means each including a squelch means responsive to said squelch signal and operative to disable said memory means from generating said memory signals during said predetermined duration, said switching means also being responsive to said reselector signal and operative to reconnect each channel to the utilization means.

33. In a multiple channel speech communication system in which a speech transmitting means is coupled to a speech utilization means through a plurality of channels each of which comprises the combination of a transmission link and a receiver each providing an audio frequency channel output signal for application to the speech utilization means, the improvement for automatically selecting the best available channel output signal for application to the speech utilization means, said improvement comprising:

detector means connected to each receiver to receive its channel output signal and to provide a detected signal whose wave form is commensurate with the envelop of the channel output signal;

memory means connected to each detector means to receive its detected signal and to provide a memory signal which is a measure of the immediate past history of said detected signal and which rises in amplitude with each successive amplitude change of said detected signal and which decays in amplitude during the time elapsing between successive amplitude changes of said detected signal, said memory means having a decay time constant greater than one second;

comparator means connected to each memory means to receive its memory signal and to provide a selector signal when the memory signal reaches a preselected voltage level; and a switching means responsive to said selector signal and operative to disconnect each channel, except the one which caused the generation of said selector signal, from the utilization device.

34. In a multiple channel voice communication system in accordance with claim 33 in which the rise time constant and the decay time constant of said detector means are less than one-quarter of a second.

35. In a multiple channel voice communication system in accordance with claim 33 in which said memory means comprises an integrator having an output time constant between one and ten seconds.

36. In a multiple channel voice communication system in accordance with claim 33 which further includes a control means which provides a squelch signal upon the occurrence of a selector signal and a reselector signal at the end of a predetermined time interval after the occurrence of said selector signal which terminates said squelch signal, and in which each of said memory means includes a squelch circuit responsive to said squelch signal and operative to disable said memory means from developing said memory signals during said predetermined time interval, and in which said switching means is also responsive to said reselector signal and operative to reconnect all channels to said utilization device for commencing a new selection.

37. In a multiple channel voice communication system in accordance with claim 36 which includes a transmission path hold means responsive to a transmission path selection signal and operative to provide a gating signal.

38. In a multiple channel voice communication system in accordance with claim 36 which includes a further voice transmission means associated with said receivers and a further receiver means associated with said voice transmitting means for transmitting voice signals in the opposite direction, said further voice transmission means and said further receiver means being connectible through any one of said transmission links, said further voice transmission means providing a start transmit signal and an end transmit signal, gating means for gating said reselector signal, said gating means being responsive to said start transmit signal and operative to close said gate during the duration of transmission, said control means being responsive to said end transmission signal and operative to provide a reselector signal upon the occurrence of said end transmission signal.

39. In a plural channel transmission system in which a signal having a periodic characteristic in addition to the intelligence is transmitted from a signal transmission means to a common intelligence signal utilization means through a plurality of channels, and in which each channel includes a signal transmission link and a signal reception means which provide a channel output signal including the intelligence for application to the common intelligence signal utilization means, the improvement for automatically selecting the best channel output signal for application to the common intelligence signal utilization means, said improvement comprising:

detector means coupled to each reception means to receive its channel output signal and to provide a detected signal which is commensurate with the periodic characteristic of the signal;

memory means coupled to each detector means to receive the detected signal and to provide a memory signal which is a measure of the immediate past history of the detected signal in that it rises in amplitude with each amplitude change of the detected signal and decays in amplitude during the elapsed time between amplitude changes of said detected signal, said memory means having a decay time constant greater than twice the period of the periodic characteristic;

comparator means simultaneously responsive to all memory signals and operative to provide a selector signal indicative of the channel with the best immediate past history memory signal; and switching means for coupling each of the channel output signals to said signal utilization means, said switching means being responsive to said selector signal and operative upon the occurrence of a selector signal to disconnect each channel output signal, except the one with the best immediate past history memory signal, from the utilization means.

References Cited

UNITED STATES PATENTS

| | | | |
|---|---|---|---|
| 2,521,696 | 9/1950 | De Armond | 325—304 |
| 2,572,912 | 10/1951 | Bucher | 325—304 |
| 2,743,354 | 4/1956 | Hansell | 325—304 |
| 2,985,755 | 5/1961 | Giesselman | 325—304 |
| 3,102,236 | 8/1963 | Eichenberger | 325—478 |
| 3,035,169 | 5/1962 | Griffith | 325—3 |

ROBERT L. GRIFFIN, *Primary Examiner.*

A. J. MAYER, *Assistant Examiner.*